Patented May 16, 1939

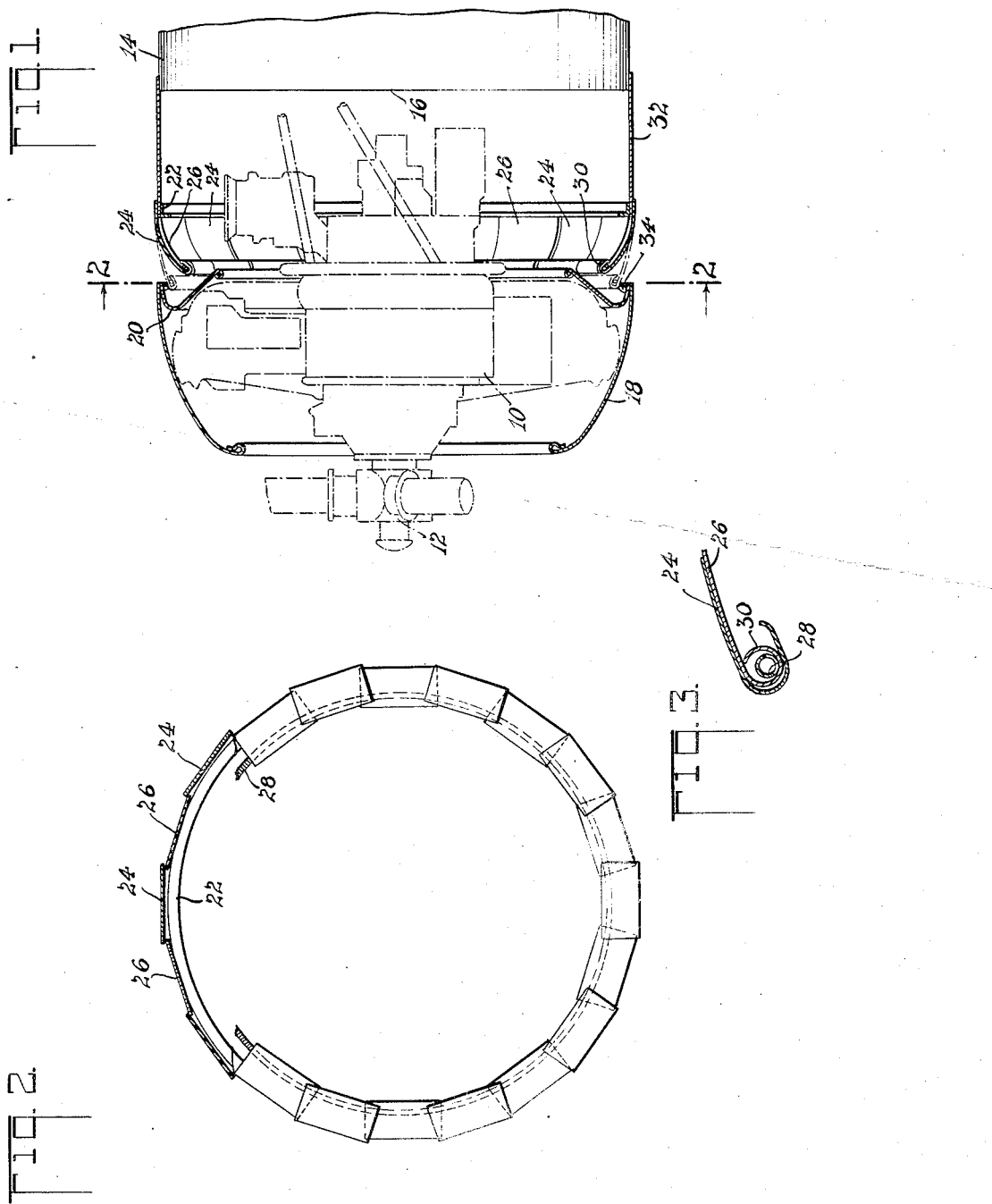

2,158,270

UNITED STATES PATENT OFFICE 2,158,270

CONTROLLABLE COWLING

Kenneth A. Browne, Westwood, N. J., assignor to Wright Aeronautical Corporation, a corporation of New York Application October 16, 1937, Serial No. 169,355

3 Claims. (Cl. 123—171)

This invention relates to the cowling and cooling of air-cooled engines, and in certain respects comprises improvements on the co-pending application of Roland Chilton, Serial No. 169,349, filed October 16, 1937.

That application discloses flexible segments controllable to vary the width of the cowling exit slot, the control being operable to give a wide slot for takeoff, climb and other slow speed high power conditions and a narrow slot for cruising and higher speeds.

According to the teachings of the present invention, the control elements are deleted and the stiffness characteristics of the flexible members are so proportioned that they move from open to closed position automatically in response to air pressure changes following on changes in flying speed.

The cowling is of the type employing a front entrance and an annular exit in combination with a "pressure-baffled engine", that is to say, an engine having baffles closely fitted to the finned profile of the cylinders whereby all of the airflow is confined to pass through the cylinder finning. In such cowling, cooling depends upon the pressure differential, in front of and behind the baffles, generated by the cowl due to the forward speed of the airplane. This differential varies with the square of the speed and with current practice, at climbing speeds of around one hundred miles an hour, about 3″ of pressure differential is all that is obtained with conventional cowling. Under level flight cruising conditions, however, the speed will be at least doubled and the pressure differential accordingly four times as much, representing a great excess over the cooling requirements for this normal part-throttle operation. This excess airflow has to be obtained at the expense of increased drag with normal fixed cowling, and accordingly, this invention provides a novel automatic means for damping this flow by changing the width of the exit slot to be maximum for takeoff and climb, and to be much smaller during cruising and other high speed operation.

Other objects of the invention will be obvious from, or will be pointed out in the following description with reference to the drawing, in which:

Fig. 1 is a longitudinal section through the cowling of the invention;

Fig. 2 is an end view with the upper part in section on the line 2 of Fig. 1, and Fig. 3 is a fragmentary section through overlapping segments.

In the drawing, 10 designates a conventional engine having the usual propeller 12 and mounted in an airplane fuselage 14 having the usual "firewall" 16. The cowl comprises a curved shell 18 embracing the engine and provided with an annular air deflector or guide 20. To the rear of this cowl there is provided a ring or frame 22 to which are secured the rear ends of forwardly extending curved flexible segments 24—26 slightly overlapped at adjacent edges as indicated in Fig. 2. Cowling 32 comprises a closure from the ring 22 to the firewall 16.

In this automatic embodiment the segments, when the airplane is at rest, are conformed to the disposition shown in full lines in Fig. 1 which may be achieved by means of the inherent spring in the segments and by the aid of a circular coil spring 28 running through hollow beads 30 formed in the front edges of the segments 26. It will be understood that as the speed of the airplane increases, the static air pressure in the space behind the engine defined by the bulkhead 16 and the cowling 32 also increase and this pressure is effective on the inside of the flexible segment 24—26, tending to urge them to the position shown in dotted lines in Fig. 1 whereat the segments abut suitable stop fingers 34 set to give the minimum width of exit slot required for high speed flight.

It is contemplated that the movement of the segments from the open to the shut position will take place suddenly when a certain air speed (determined by the setting of the spring 28) is reached. It will be seen that once the air pressure inside the segment is sufficient to initiate movement, the resultant narrowing of the exit slot will throttle or damper the flow through that slot, thereby increasing the closing pressure on the flexible segments which will therefore be unstable until they encounter the stops 34. The spring characteristics of the assembly will be adjusted so that closure will occur at a flying speed intermediate the climbing and cruising speed. In modern airplanes this represents a speed range of at least 2:1 so that no great accuracy in the speed response of the device is necessary for normal operation wherein climbing and cruising (or full speed flight) represent widely separated regimes.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft, an engine including streamlined forward and rearward annular cowls one embracing the engine, axially spaced apart to define an annular gap therebetween, flexible segmental flaps fixed to one said cowl and extending across said gap, and stops limiting the outward movement of said flaps to a position substantially flush with the cowl profile, resilient means urging said flaps radially inward of the cowl profile to form an enlarged air exit slot between said cowls, said flaps being movable outwardly to close the exit slot under the influence of a greater pressure within than without the cowling.

2. In aircraft, an engine including streamlined forward and rearward annular cowls one embracing the engine, axially spaced apart to define an annular gap therebetween, flexible segmental flaps fixed to one said cowl and extending across said gap, and stops limiting the outward movement of said flaps to a position substantially flush with the cowl profile, resilient means urging said flaps radially inward of the cowl profile to form an enlarged air exit slot between said cowls, said flaps being movable outwardly to close the exit slot under the influence of a greater pressure within than without the cowling, said means comprising beads formed at the free edges of said flaps and a coil spring threaded through said beads.

3. In combination, an air-cooled radial cylinder engine, axially spaced, aligned, streamlined annular cowls, one embracing the engine, defining therebetween an annular exit opening, for engine cooling air, a plurality of segmental spring flaps fixed to the leading edge of the rear cowl, movable between a position inwardly of the trailing edge of the front cowl whereat a large air exit annulus is defined, and a position adjacent the trailing edge of the front cowl whereat a small air exit annulus is defined, said flaps being responsive in their movement between and to said positions to the air pressure differential between the inside and outside of the cowls, and means resiliently urging said cowls to the inner, large air exit opening, position.

KENNETH A. BROWNE.